(12) United States Patent
Wang et al.

(10) Patent No.: US 12,128,476 B2
(45) Date of Patent: Oct. 29, 2024

(54) SYSTEM AND METHOD OF MAKING A CAST REVERSE TILT-POURED FUEL CELL CRADLE

(71) Applicant: GM Global Technology Operations LLC, Detroit, MI (US)

(72) Inventors: Qigui Wang, Rochester Hills, MI (US); Liang Wang, Rochester Hills, MI (US); Tiruttani Munikamal, Bengaluru (IN); Shasha Vali Shaik, Bangalore (IN); Suresh Kumar K, Bangalore (IN); Steven L Burkholder, Archbold, OH (US); Thomas W. Gustafson, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/158,725

(22) Filed: Jan. 24, 2023

(65) Prior Publication Data
US 2024/0246142 A1    Jul. 25, 2024

(51) Int. Cl.
B22D 25/04        (2006.01)
B22D 21/00        (2006.01)
B22D 35/04        (2006.01)

(52) U.S. Cl.
CPC ........... B22D 25/04 (2013.01); B22D 21/007 (2013.01); B22D 35/04 (2013.01)

(58) Field of Classification Search
CPC ...... B22D 21/00; B22D 21/007; B22D 25/02; B22D 25/04; B22D 30/00; B22D 35/04; B22D 41/04

USPC ......................... 164/133, 136, 271, 335, 336
See application file for complete search history.

(56) References Cited

U.S. PATENT DOCUMENTS 3,680,625 A *   8/1972   Hein et al. ............. C30B 11/003
                                                    164/129
2019/0337049 A1* 11/2019  Goettsch et al. ....... B22C 9/068

FOREIGN PATENT DOCUMENTS

WO    WO-2010058003 A1 *  5/2010   ........... B22D 23/006

OTHER PUBLICATIONS

Machine translation of WO 2010058003 A1 (Year: 2010).*
U.S. Appl. No. 17/935,769, filed Sep. 27, 2022.

* cited by examiner

Primary Examiner — Kevin P Kerns
(74) Attorney, Agent, or Firm — Vivacqua Crane, PLLC

(57) ABSTRACT

A system and method of manufacturing an aluminum fuel cell cradle includes providing a negative cast mold having cavities to form the cradle having a length greater than a width to define a longitudinal axis and providing a feeding mechanism disposed about the mold and in fluid communication with the cavities thereof. The feeding mechanism includes primary risers connected to and in fluid communication with the cavities. The method further includes melting a first metallic material to define a molten metallic material, moving the mold to a vertical orientation about the longitudinal axis while feeding molten metallic material through the runner to the cavities, and moving the cast mold to a horizontal orientation. A second solidification time in the risers is greater than a first solidification time in the mold such that shrinkage of the solidified metallic material occurs in the risers away from the mold.

20 Claims, 5 Drawing Sheets

SYSTEM AND METHOD OF MAKING A CAST REVERSE TILT-POURED FUEL CELL CRADLE

INTRODUCTION

The present disclosure relates to cast metallic tilt-poured fuel cell cradles and more particularly system and methods of making reverse tilt-poured fuel cell cradles that compensate for shrinkage during a casting process.

A fuel cell cradle is used to hold a fuel cell during installment of the fuel cell to a vehicle. Many fuel cell cradles are cast molded with metallic material such as a metal or a metal alloy. During solidification of the metallic material, undesirable shrinkage in the mold may occur.

SUMMARY

Thus, while current systems and methods of making fuel cell cradles achieve their intended purpose, there is a need for a new and improved system and method of manufacturing a cast metallic reverse tilt-poured fuel cell cradle for a fuel cell of a vehicle.

In accordance with one aspect of the present disclosure, a method of manufacturing a cast metallic reverse tilt-poured fuel cell cradle for a fuel cell of a vehicle is provided. The method comprises providing a negative cast mold having cavities to form the cradle. The cradle comprises a plurality of support legs interconnectedly arranged to define a framework having first and second sides for supporting the fuel cell. The framework has a length greater than a width to define a longitudinal axis formed along the length thereof. The framework has horizontal and vertical casting orientations about the longitudinal axis for casting the cradle.

In this aspect, each support leg has peripheral edges thereabout. Moreover, each support leg has a first outer ridge and a second outer ridge formed on the peripheral edges relative to the vertical casting orientation on the second side of the framework. Additionally, each of the outer ridges extends therealong on the second side. At least one support leg has one inner ridge formed away from the peripheral edges and extends thereacross on the second side.

The cradle further comprises a plurality of peripheral bosses formed on the second side of the framework for structural attachment to define a riser contact area. Each peripheral boss has a boss diameter and is formed on one of the support legs in abutment with one of the first outer ridge and the inner ridge.

The method further comprises providing a feeding mechanism disposed about the cast mold and in fluid communication with the cavities thereof. The feeding mechanism comprises a runner disposed about and in fluid communication with the cast mold. The feeding mechanism further comprises a plurality of ingates in fluid communication with the runner and the cavities of the cast mold. Each ingate has a first side connected to the runner extending to a second side connected to the cast mold.

The feeding mechanism further comprises a plurality of primary risers connected to and in fluid communication with cavities of the cast mold. Each primary riser is connected to one support leg at one of the riser contact areas on the second side and arranged adjacent to the one peripheral boss. Moreover, each primary riser is arranged vertically above the one peripheral boss relative to the horizontal casting orientation of the framework.

The method further comprises melting a first metallic material at a predetermined temperature to define a molten metallic material.

The method further comprises moving the cast mold and the feeding mechanism from the horizontal casting orientation to the vertical casting orientation about the longitudinal axis while feeding the molten metallic material through the runner to the cavities of the cast mold. The method further comprises, after feeding the molten metallic material to the cavities, moving the cast mold and the feeding mechanism from the vertical orientation to the horizontal orientation about the longitudinal axis.

The method further comprises cooling the molten metallic material at a first solidification time in the cast mold and a second solidification time in the plurality of risers to define a solidified metallic material in the risers and in the cast mold having dimensions of the cast metallic fuel cell cradle. Moreover, the second solidification time is greater than the first solidification time such that shrinkage of the solidified metallic material occurs in the risers away from the cast mold. The method further comprises separating the solidified metallic material from the negative sand cast mold to define the cast metallic tilt-poured fuel cell cradle.

In one example, each primary riser has a height that is at least twice the boss diameter. In another example, each primary riser has a width that is greater than the boss diameter.

In another example, the cradle further comprises at least one secondary boss disposed adjacent to one peripheral boss on the second side of the framework and arranged downward therefrom relative to the vertical casting orientation, each secondary boss having the boss diameter. In yet another example, the first metallic material comprises 7.0 weight percent (wt %) silicon (Si), 0.4 wt % magnesium (Mg), 0.14 wt % iron (Fe), and a balance of aluminum (Al).

In another embodiment, the runner comprises a first inlet and a second inlet in fluid communication with the first inlet. The first and second inlets are arranged in an upward direction relative to the vertical orientation. The runner further comprises a first stopper and a second stopper arranged to be connectable to the first inlet and the second inlet, respectively, to avoid backflow. In still another example, the step of moving the cast mold and feeding mechanism to the horizontal orientation comprises connecting the first stopper to the first inlet and connecting the second stopper to the second inlet to avoid backflow of molten metallic material.

In accordance with another aspect of the present disclosure, a system for manufacturing a cast aluminum reverse tilt-poured fuel cell cradle for a fuel cell of a vehicle is provided. The system comprises a molding unit arranged to form a negative cast mold of the cast aluminum tilt-poured fuel cell cradle. The mold comprises at least one molded cavity having a pattern with dimensions of the cast aluminum cradle. The cradle comprises a plurality of support legs interconnectedly arranged to define a framework having first and second sides for supporting the fuel cell. The framework has a length greater than a width to define a longitudinal axis formed along the length thereof. Moreover, the framework has horizontal and vertical casting orientations for casting the cradle.

Each support leg has peripheral edges thereabout. Moreover, each support leg has a first outer ridge and a second outer ridge formed on the peripheral edges relative to the vertical casting orientation on the second side of the framework. Additionally, each of the outer ridges extends therealong on the second side. At least one support leg has one inner ridge formed away from the peripheral edges and extends thereacross on the second side.

The cradle further comprises a plurality of peripheral bosses formed on the second side of the framework for structural attachment defining a riser contact area. Each peripheral boss has a boss diameter and is formed on one of the support legs in abutment with one of the first outer ridge and the inner ridge.

The system further comprises a feeding mechanism disposed about the cast mold and in fluid communication with the cavities thereof. The feeding mechanism comprises a runner disposed about and in fluid communication with the cast mold. Moreover, the feeding mechanism further comprises a plurality of ingates in fluid communication with the runner and the cavities of the cast mold. Additionally, each ingate has a first side connected to the runner extending to a second side connected to the cast mold.

The feeding mechanism further comprises a plurality of primary risers connected to and in fluid communication with cavities of the cast mold. Each primary riser is connected to one support leg at one of the riser contact areas on the second side and is arranged adjacent to the one peripheral boss. Moreover, each primary riser is arranged vertically above the one peripheral boss relative to the horizontal casting orientation of the framework.

The system further comprises a furnace arranged to melt a first metallic material at a predetermined temperature to define a molten metallic material. The system further comprises a tilt apparatus moveably connected to the cast mold and the feeding mechanism. The tilt apparatus is arranged to move the cast mold and the feeding mechanism from the horizontal casting orientation to the vertical casting orientation about the longitudinal axis while feeding molten metallic material through the runner to the cavities of the cast mold. Moreover, the tilt apparatus is arranged to move the cast mold and the feeding mechanism from the vertical orientation to the horizontal orientation about the longitudinal axis after feeding molten metallic material to the cavities of the cast mold.

The system further comprises a cooling area arranged to solidify the molten metallic material at a first solidification time in the cast mold and a second solidification time in the plurality of risers to define a solidified metallic material in the risers and in the cast mold. Moreover, the cast mold has dimensions of the cast aluminum fuel cell cradle. The second solidification time is greater than the first solidification time such that shrinkage of the solidified metallic material occurs in the risers away from the cast mold. The system further comprises a separation unit arranged to separate the solidified metallic material from the negative cast mold to define the cast aluminum tilt-poured fuel cell cradle.

The system further comprises a controller in communication with the molding unit, the furnace, the feeding mechanism, the tilt apparatus, and the separation unit. The controller is arranged to control the molding unit, the furnace, the feeding mechanism, the tilt apparatus, and the separation unit The system further comprises a power source arranged to power the molding unit, the furnace, the feeding mechanism, the tilt apparatus, the separation unit, and the controller.

In one embodiment, each primary riser has a height that is at least twice the boss diameter. In another embodiment, each primary riser has a width that is greater than the boss diameter. In yet another embodiment, the cradle further comprises at least one secondary boss disposed adjacent to one peripheral boss on the second side of the framework and arranged downward therefrom relative to the vertical casting orientation, each secondary boss having the boss diameter.

In another embodiment, the first metallic material comprises 7.0 weight percent (wt %) silicon (Si), 0.4 wt % magnesium (Mg), 0.14 wt % iron (Fe), and a balance of aluminum (Al).

In yet another embodiment, the runner comprises a first inlet and a second inlet in fluid communication with the first inlet. The first and second inlets are arranged in an upward direction relative to the vertical orientation. Moreover, the runner comprises a first stopper and a second stopper arranged to be connectable to the first inlet and the second inlet, respectively, to avoid backflow. In another embodiment, the tilt apparatus is arranged to move the cast mold and feeding mechanism to the horizontal orientation after feeding molten material to the cavities. The tilt apparatus is also arranged to connect the first stopper to the first inlet and connect the second stopper to the second inlet to avoid backflow of molten metallic material.

In yet another aspect of the present disclosure, a system for manufacturing a cast aluminum reverse tilt-poured fuel cell cradle for a fuel cell of a vehicle is provided. The system comprises a molding unit arranged to form a negative cast mold of the cast aluminum tilt-poured fuel cell cradle. The mold comprises at least one molded cavity having a pattern with dimensions of the cast aluminum cradle.

The cradle comprises a plurality of support legs interconnectedly arranged to define a framework having first and second sides for supporting the fuel cell. The framework has a length greater than a width to define a longitudinal axis formed along the length. Moreover, the framework has horizontal and vertical casting orientations for casting the cradle.

Each support leg has peripheral edges thereabout. Moreover, each support leg has a first outer ridge and a second outer ridge formed on the peripheral edges relative to the vertical casting orientation on the second side of the framework. Each of the outer ridges extends therealong on the second side. Additionally, at least one support leg has one inner ridge formed away from the peripheral edges and extending thereacross on the second side.

The cradle further comprises a plurality of peripheral bosses formed on the second side of the framework for structural attachment defining a riser contact area. Each peripheral boss has a boss diameter. Moreover, each peripheral boss is formed on one of the support legs and in abutment with one of the first outer ridge and the inner ridge.

The system further comprises a feeding mechanism disposed about the cast mold and in fluid communication with the cavities thereof. The feeding mechanism comprises a runner disposed about and in fluid communication with the cast mold. The runner comprises a first inlet and a second inlet in fluid communication with the first inlet. Moreover, the first and second inlets are arranged in an upward direction relative to the vertical orientation. The runner further comprises a first stopper and a second stopper arranged to be connectable to the first inlet and the second inlet, respectively, to avoid backflow.

The feeding mechanism further comprises a plurality of ingates in fluid communication with the runner and the cavities of the cast mold. Each ingate has a first side connected to the runner extending to a second side connected to the cast mold. The feeding mechanism further comprises a plurality of primary risers connected to and in fluid communication with cavities of the cast mold. Each primary riser is connected to one support leg at one of the riser contact areas on the second side and arranged adjacent to the one peripheral boss. Moreover, each primary riser is arranged vertically above the one peripheral boss relative to the horizontal casting orientation of the framework.

The system further comprises a furnace arranged to melt a first metallic material at a predetermined temperature to define a molten metallic material. The system further comprises a tilt apparatus moveably connected to the cast mold and the feeding mechanism. The tilt apparatus is arranged to move the cast mold and the feeding mechanism from the horizontal casting orientation to the vertical casting orientation about the longitudinal axis while feeding molten metallic material through the runner to the cavities of the cast mold. Additionally, the tilt apparatus is arranged to move the cast mold and the feeding mechanism from the vertical orientation to the horizontal orientation about the longitudinal axis after feeding molten metallic material to the cavities of the cast mold.

The system further comprises a cooling area arranged to solidify the molten metallic material at a first solidification time in the cast mold and a second solidification time in the plurality of risers to define a solidified metallic material in the risers and in the cast mold having dimensions of the cast aluminum fuel cell cradle. The second solidification time is greater than the first solidification time such that shrinkage of the solidified metallic material occurs in the risers away from the cast mold. The system further comprises a separation unit arranged to separate the solidified metallic material from the negative cast mold to define the cast aluminum tilt-poured fuel cell cradle.

The system further comprises a controller in communication with the molding unit, the furnace, the feeding mechanism, the tilt apparatus, and the separation unit. The controller is arranged to control the molding unit, the furnace, the feeding mechanism, the tilt apparatus, and the separation unit. The system further comprises a power source arranged to power the molding unit, the furnace, the feeding mechanism, the tilt apparatus, the separation unit, and the controller.

In one embodiment, each primary riser has a height that is at least twice the boss diameter. In another embodiment, each primary riser has a width that is greater than the boss diameter. In yet another embodiment, the cradle further comprises at least one secondary boss disposed adjacent to one peripheral boss on the second side of the framework and arranged downward therefrom relative to the vertical casting orientation. Each secondary boss has the boss diameter.

In another embodiment, the first metallic material comprises 7.0 weight percent (wt %) silicon (Si), 0.4 wt % magnesium (Mg), 0.14 wt % iron (Fe), and a balance of aluminum (Al). In still another embodiment, the tilt apparatus is arranged to move the cast mold and feeding mechanism to the horizontal orientation after feeding and connect the first stopper to the first inlet and connecting the second stopper to the second inlet to avoid backflow of molten metallic material.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Aspects of the present disclosure provide systems and methods of manufacturing a cast aluminum reversed tilt-poured fuel cell cradle for a vehicle wherein the cradle has high elasticity and high strength. The systems and methods provide a way to compensate for cast aluminum shrinkage in a cast mold during solidification in a casting process of the cradle. As a result, metal shrinkage occurs away from the cast mold in overflow risers.

Figure 1:
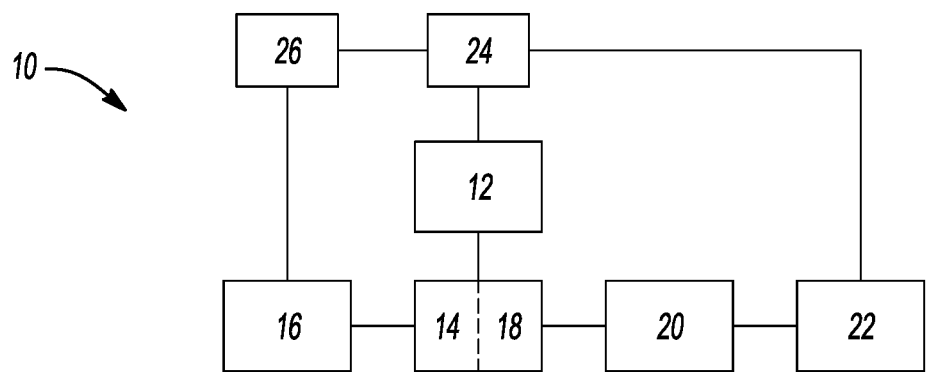
FIG. 1 is a schematic view of a system for manufacturing a cast aluminum reverse tilt-poured fuel cell cradle in accordance with one embodiment of the present disclosure.

FIG. 1 depicts a system 10 for manufacturing a cast aluminum reverse tilt-poured fuel cell cradle with low porosity for a vehicle in accordance with one embodiment of the present disclosure. As shown, the system 10 comprises a molding unit 12 arranged to have a negative cast mold 30 (FIGS. 2A and 2B) of the cast aluminum reverse tilt-poured fuel cell cradle 100 (FIG. 2C). The mold 30 comprises at least one molded cavity, preferably a plurality of molded cavities, having a pattern or patterns to define dimensions of the cast aluminum reverse tilt-poured fuel cell cradle. In one example, the mold 30 has patterns made with green or chemically bonded sand. An assembly of core may then be disposed within the mold 30 to further define the dimensions or structure of the pattern. It is to be understood that the mold 30 may be made by any other suitable manner without departing from the spirit or scope of the present disclosure.

Figure 2A:
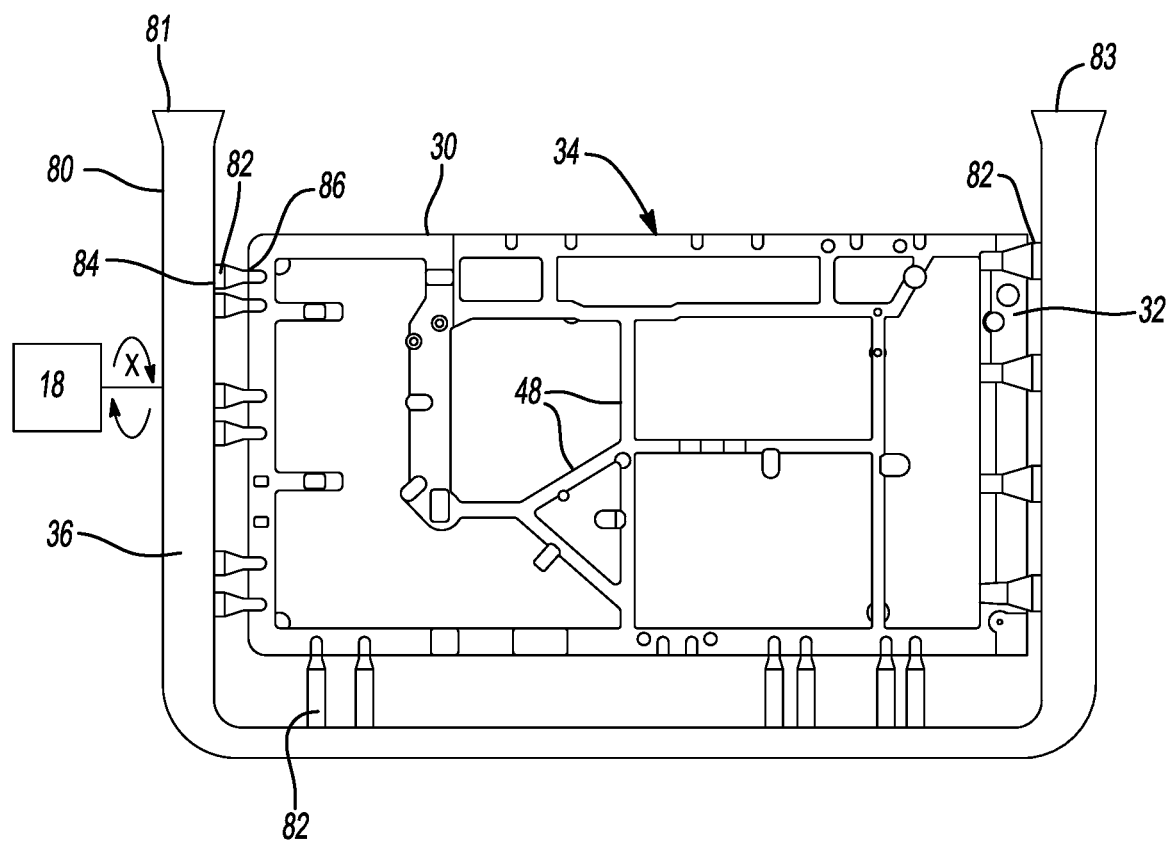
FIG. 2A is a front side view of a feeding mechanism and a cast mold of the fuel cell cradle of the system in FIG. 1 in accordance with one embodiment.
Figure 2B:
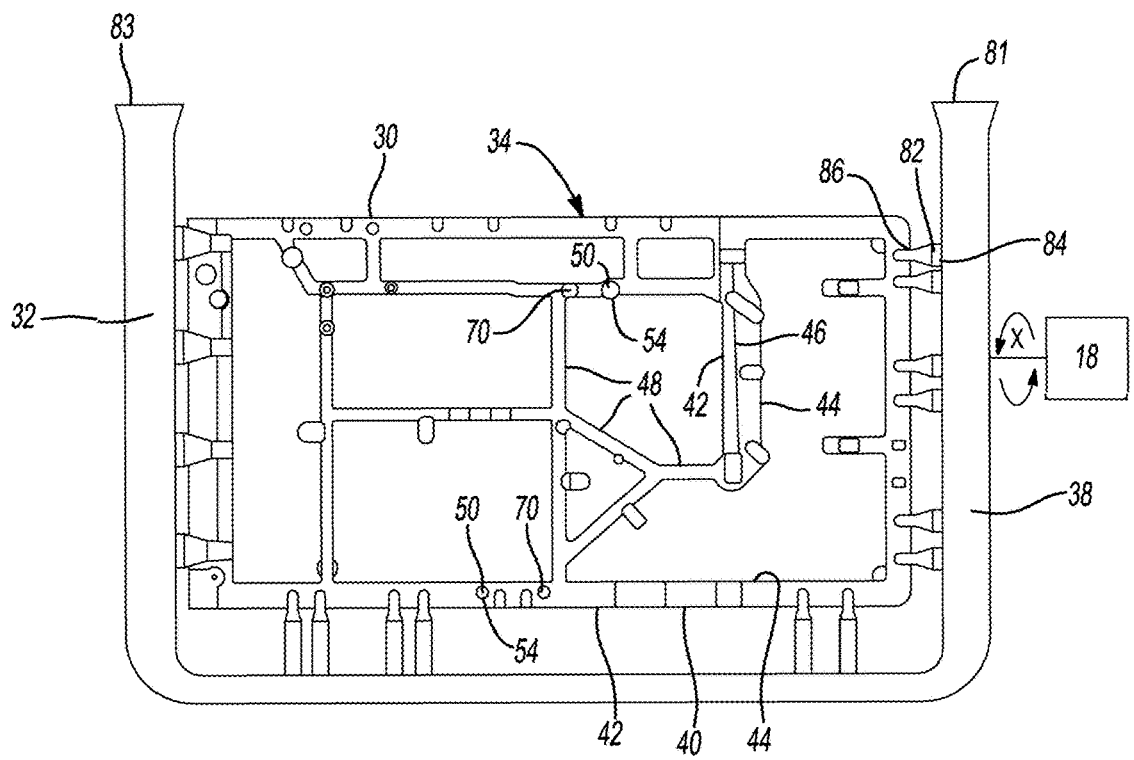
FIG. 2B is a back side view of the feeding mechanism and the cast mold in FIG. 2A.
Figure 2C:
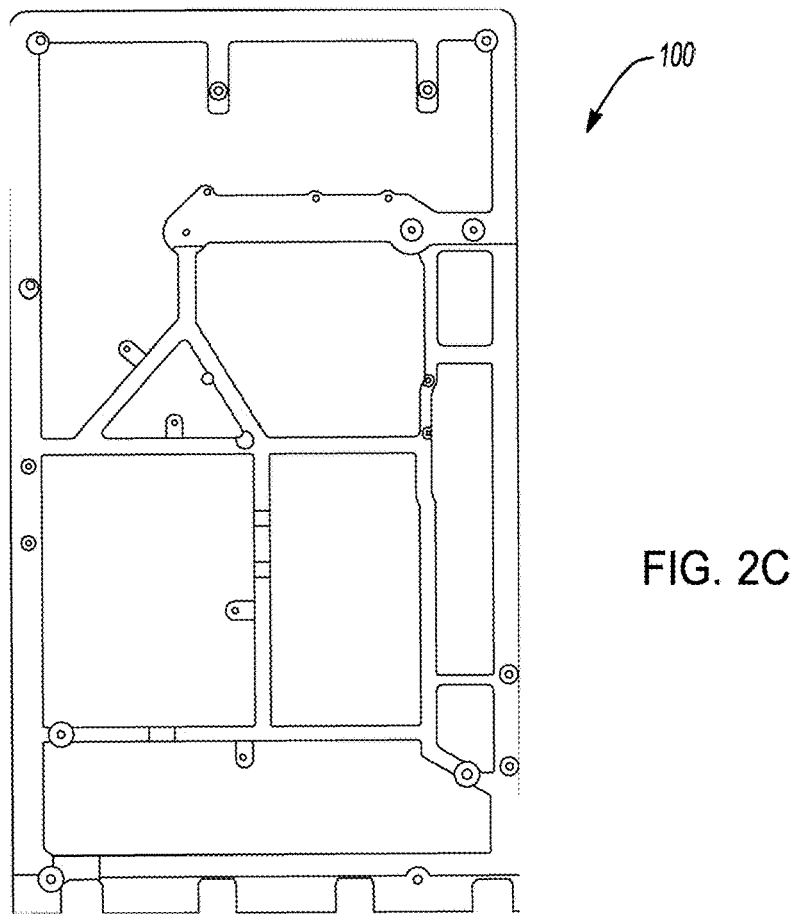
FIG. 2C is a front side of a cast aluminum reverse tilt fuel cell cradle from the cast mold in FIGS. 2A and 2B.

Referring to FIGS. 1-2B, the negative cast mold 30 has dimensions that define the cradle comprising a plurality of support legs 32 interconnectedly arranged to define a framework 34 having first and second sides 36, 38 for supporting the fuel cell. In this embodiment, the first side 36 (FIG. 2A) is a front side and the second side 38 (FIG. 2B) is a back side of the framework 34. As shown, the back side of the framework 34 comprises a waffle structure as will be described in greater detail below. As shown, the framework has a length greater than a width defining a longitudinal axis formed along the length thereof.

The framework 34 has a horizontal casting orientation (FIGS. 3A-3B) and a vertical casting orientations (FIG. 4) for casting the cradle. In FIGS. 2A and 2B, the framework 34 is shown to be in the vertical casting orientation along a vertical plane. In one embodiment, the vertical plane defines a front cut half and a back drag half of the mold. As depicted in FIGS. 2A and 2B, the framework 34 has an axis of rotation X about the longitudinal axis. Thus, the framework 34 may be moved, tilted, or rotated about the longitudinal axis during a method of making the cradle (discussed below).

Referring to FIG. 2B, each support leg 32 has peripheral edges 40 formed thereabout.

Moreover, each support leg 32 has a first outer ridge 42 and a second outer ridge 44 formed on the peripheral edges 40 on the second side 38 of the framework 34. In this embodiment, each of the outer ridges extends therealong on the second side 38. Furthermore, at least one support leg 32 has one inner ridge 46 formed away from the peripheral edges 40 and extends thereacross on the second side 38. As shown, the inner ridge 46 may be formed perpendicular to or in parallel with one of the outer ridges. As shown, at least one support leg 32 is arranged in a vertical position relative to the vertical casting orientation defining a secondary leg 48 (FIG. 2B).

As depicted in FIG. 2B, the cradle further comprises a plurality of peripheral bosses 50 formed on the second side 38 of the framework 34 for structural attachment defining a riser contact area. Each peripheral boss 50 has a boss diameter. Moreover, each peripheral boss 50 is formed on one of the support legs 32 and in abutment with one of the first outer ridge 42 and the inner ridge 46.

Referring to FIG. 2B, the cradle further comprises at least one secondary boss 70 disposed adjacent to one peripheral boss 50 on the second side 38 of the framework 34. As shown, the at least one secondary boss 70 is arranged downward from the one peripheral boss 50 relative to the vertical casting orientation. Each secondary boss 70 has a boss diameter.

Referring to FIGS. 1-4, the system 10 further comprises a feeding mechanism 14 arranged to feed the molten metallic material in the at least one cavity of the mold 30 defining the dimensions of the cradle to be cast. In this embodiment, the feeding mechanism 14 is disposed about the cast mold 30 and in fluid communication with the cavities thereof. In one example, the feeding mechanism 14 comprises a pouring ladle (not shown), a down sprue (not shown), a filter (not shown) in fluid communication with the down sprue, and a runner 80 in fluid communication with the down sprue and with the cast mold 30. As shown, the runner is disposed about the cast mold 30. In this example, the pouring ladle receives molten metallic material (e.g., aluminum alloy) for pouring the molten metallic material in the down sprue having the filter to eliminate oxides from the molten metallic material. As mentioned, the down sprue is in fluid communication with the runner (here, a double runner with first and second wings) through which the molten metallic material flows from the filter.

As shown in FIGS. 2B and 3A-4, the runner 80 comprises a first inlet 81 and a second inlet 83 in fluid communication with the first inlet 81. The first and second inlets 81, 83 are arranged in an upward direction relative to the vertical orientation. Moreover, the runner 80 comprises first and second stoppers 85 arranged to be connectable to the first inlet 81 and the second inlet 83 to avoid backflow. As depicted in FIGS. 5A and 5B, each stopper 85 includes a plug 88 and a pin 91 insertable through the plug 88. In this example, the pin 91 may have a gate 92 attached thereto and biasing members 94 attached to the gate 92.

It is to be understood that the first and second stoppers 85 may comprise any other suitable mechanism to prevent backflow during cooling and solidification without departing from the spirit or scope of the present disclosure.

Figure 3A:
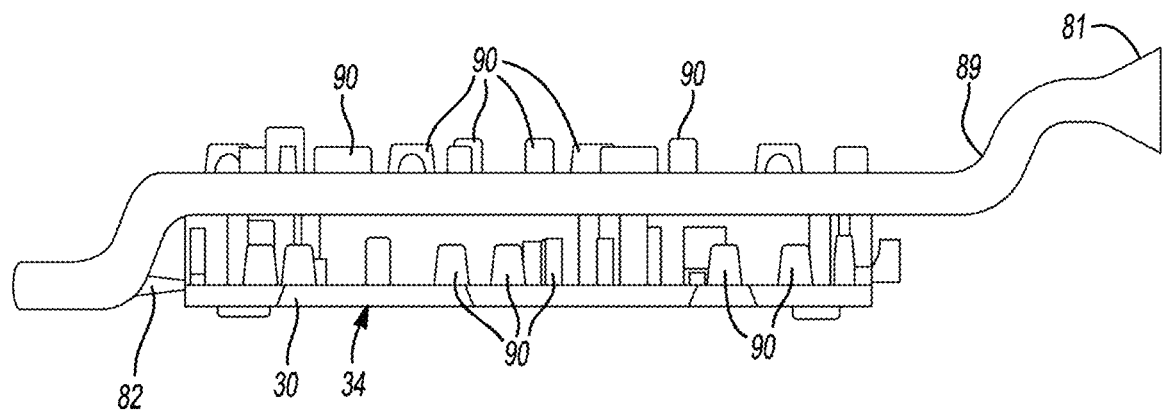
FIG. 3A is a side view of the feeding mechanism and the cast mold of FIG. 2A in a horizontal casting orientation.
Figure 3B:
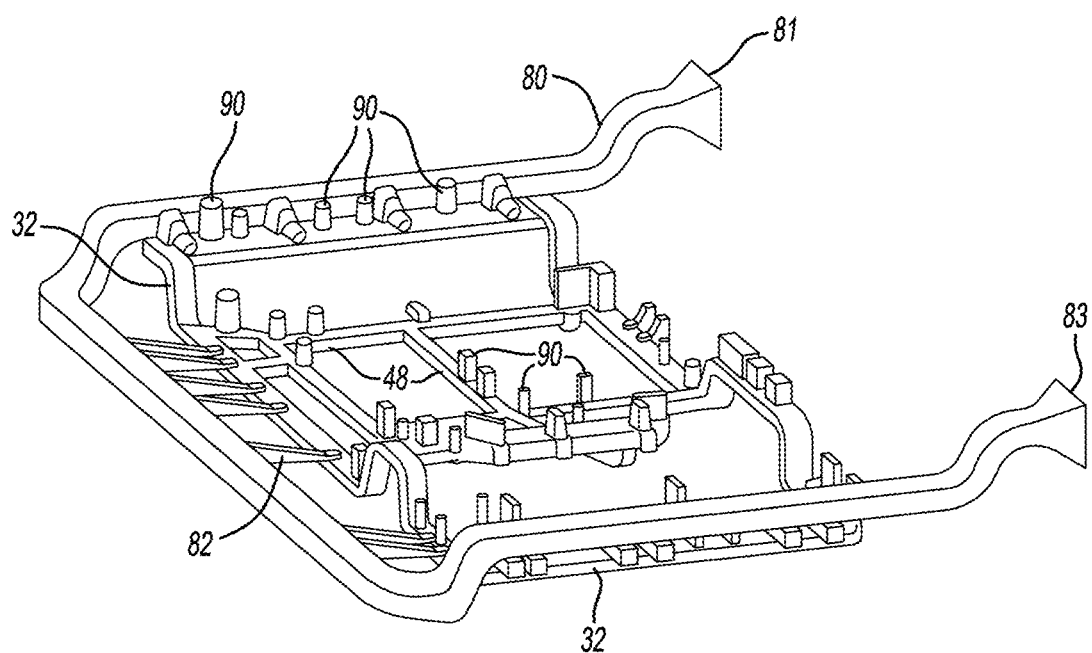
FIG. 3B is a perspective view of the feeding mechanism and the cast mold of FIG. 3A in the horizontal casting orientation.

As shown in FIG. 3A, the runner 80 is formed such that the first and second inlets 81, 83 are higher in position from the cast mold relative to the horizontal casting orientation. In this example, the runner 80 has a neck 89 that extends upwardly to first and second inlets 81, 83 to prevent backflow of the metallic material during cooling and solidification of the metallic material.

As shown in FIG. 2B, the feeding mechanism 14 further comprises a plurality of ingates 82 in fluid communication with the runner and the cavities of the cast mold 30. Each ingate 82 has a first ingate side 84 connected to and in fluid communication with the runner 80. The first ingate side 84 extends to a second ingate side 86 connected to and in fluid communication with the cast mold 30.

Figure 4:
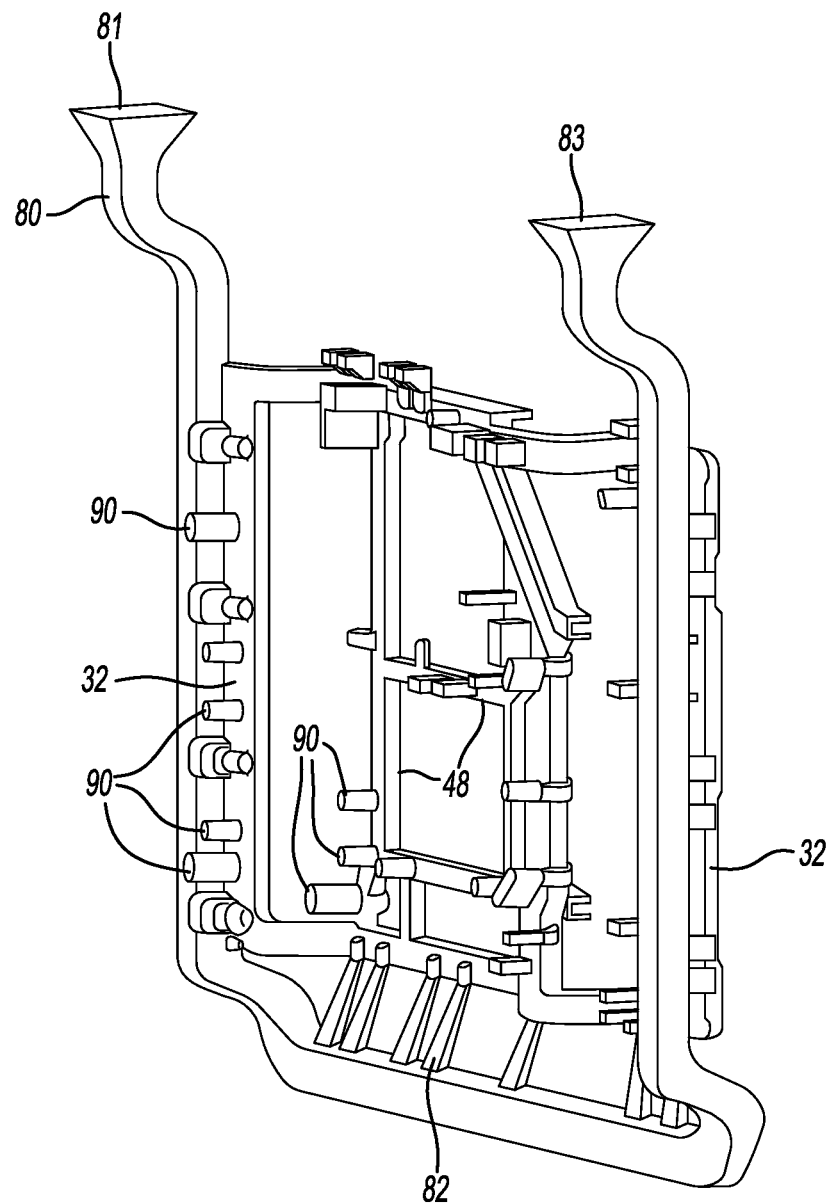
FIG. 4 is a perspective view of the feeding mechanism and the cast mold of FIG. 3B in a vertical casting orientation.
Figures 5A, 5B:
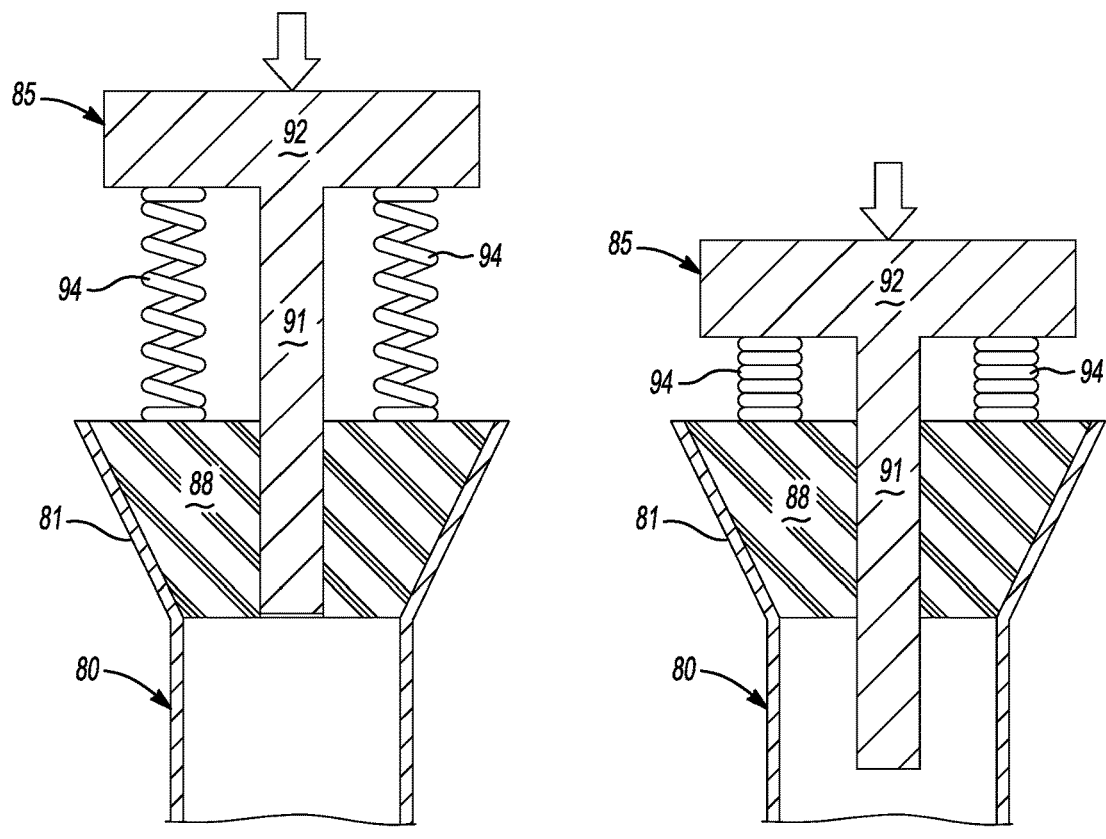
FIG. 5A is a partial side view of a runner having a stopper in a partially open position.
FIG. 5B is a partial side view of the runner in FIG. 5A having the stopper in a closed position.

Referring to FIGS. 3A-4, the feeding mechanism 14 further comprises a plurality of primary risers 90 connected to and in fluid communication with cavities of the cast mold 30.

Each primary riser 90 is connected to one support leg 32 at one of the riser contact areas 54 on the second side. Moreover, each primary riser 90 is arranged adjacent to one peripheral boss 50. Additionally, each primary riser 90 is arranged vertically above the one peripheral boss 50 relative to the horizontal casting orientation of the framework 34. Preferably, each primary riser 90 has a height (relative to the horizontal orientation) that is at least twice the boss diameter. Furthermore, each primary riser 90 has a width that is preferably greater than the boss diameter.

Referring back to FIG. 1, the system 10 further comprises a furnace 16 arranged to melt a first metallic material at a predetermined temperature to define a molten metallic material. In one example, the furnace 16 may have a temperature of between 650° C. and 900° C. In one embodiment, the furnace 16 may be charged with aluminum. The furnace 16 may be an electric arc furnace, an induction furnace, or any other suitable furnace without departing from the spirit or scope of the present disclosure. Moreover, the first metallic material may comprise 7.0 weight percent (wt %) silicon (Si), 0.4 wt % magnesium (Mg), 0.14 wt % iron (Fe), and a balance of aluminum (Al).

As shown in FIG. 1, the system 10 further comprises a tilt apparatus 18 moveably connected to the cast mold 30 and the feeding mechanism 14. The tilt apparatus 18 is arranged to move the cast mold 30 and the feeding mechanism 14 from the horizontal casting orientation to the vertical casting orientation about the longitudinal axis while feeding molten metallic material through the runner to the cavities of the cast mold 30. The tilt apparatus 18 is arranged to move or tilt the cast mold 30 and feeding mechanism 14 at a controlled speed, e.g., 2 degrees per second (°/sec). It is to be understood that the controlled speed may be between 1°/sec and 10°/sec, 1°/sec, 2°/sec, 4°/sec, 6°/sec, 8°/sec or any other suitable controlled speed without departing from the spirit or scope of the present disclosure. Moreover, the controlled speed can also be adjusted with time during the rotation. For example, using a higher speed during rotation from 0-45 degrees, and using a lower speed during the rotation from 45-90 degrees. Furthermore, the tilt apparatus 18 may have a clamp, bed, or rod mechanism that attaches to the framework 34 and cast mold 30. Such mechanism may have a motor arranged to rotate the framework 34 and cast mold 30 about the rotational axis at the controlled speed.

Moreover, after feeding molten metallic material through the runner to the cavities of the cast mold 30, the tilt apparatus 18 is arranged to reverse tilt or move the cast mold 30 and feeding mechanism 14 from the vertical orientation to the horizontal orientation about the longitudinal axis. During reverse tilt, the first stopper 85 is connected to the first inlet 81 and the second stopper 85 is connected to the second inlet 83. Positioning of the risers as described above and the reverse tilt allows the molten metallic material to more uniformly solidify with less porosity in the cast.

The cast mold 30 may then be gated or sealed with chemically bonded sand. Thereafter, the molten metallic material is allowed to cool in the cast mold 30 and in the risers to a set temperature, e.g., about 450° C., in a designated cooling area (discussed below) to solidify the molten metallic material in the plurality of molded cavities of the mold 30 to form a target component having dimensions of the cradle. Preferably, the cradle is made of aluminum alloy comprising the composition discussed above.

Referring to FIG. 1, the system 10 further comprises a cooling area 20 arranged to solidify the molten metallic material at a first solidification time in the cast mold 30 and a second solidification time in the plurality of risers to define a solidified metallic material in the risers and in the cast mold 30 having dimensions of the cast aluminum fuel cell cradle. It is to be understood that the second solidification time is greater than the first solidification time such that shrinkage of the solidified metallic material occurs in the risers away from the cast mold 30. That is, during the solidification of the molten metallic material, shrinkage of the metallic material is compensated by allowing shrinkage to occur away from the cast mold 30 in the respective risers. Such compensation is due in part by riser geometry (e.g., riser height). Moreover, positioning of the risers described above and the reverse tilt allows the molten metallic material to more uniformly solidify with less porosity in the cast.

In one example, the first metallic material of the cradle is preferably aluminum alloy, e.g., A356. In another example, the solidified metallic material has a Young's module or modulus of elasticity (E) of about 75 GPa. Preferably, the solidified metallic material has an ultimate tensile strength (UTS) of about 310 megapascal (MPa), a yield strength (YS) greater than 250 MPa, and elongation (EL) of between 5% and 12%. Moreover, the solidified metallic material has a porosity of preferably less than 10%.

Referring to FIG. 1, the system 10 further comprises a separation unit 22 arranged to separate the solidified metallic material from the negative cast mold 30 to define the cast aluminum tilt-poured fuel cell cradle. In one embodiment, the separation unit 22 is arranged to shakeout or remove the mold 30 comprising the chemically bonded sand from the target component. To accomplish removal of the mold 30 from the target component, an automated unit may be used to break the mold and obtain the target component therefrom. For example, a vibration unit or table may be used having a bottom catch screen for receiving mold particles from the mold. It is to be understood that breaking the mold by any other suitable manner may be used without departing from the spirit or scope of the present disclosure.

In this embodiment, the separation unit 22 is further arranged to degate the target component after removing the mold 30 from the target component. As known in the art, degating the target component may involve removing parts of bonded sand used to fill the mold 30 during casting and gating.

In one embodiment, the separation unit 22 is further arranged to clean the target component after degating. In one example, a shot blast machine may be used to apply or shoot beads (e.g. metallic beads) on surfaces of the target component. To meet alloy design expectations, the separation unit 22 may also include an inspection area wherein the target component is inspected for its mechanical dimensions, mechanical properties, chemical composition, and microstructure. In one example, a computerized system such as a coordinate measuring machine (CMM) may be used to measure mechanical dimensions of the target component, defining the cradle 100 as shown in FIG. 2C. Any suitable methods and apparatus may be used to evaluate dimensions, mechanical properties, chemical composition, and microstructure of the cradle without departing from the spirit or scope of the present disclosure.

As depicted in FIG. 1, the system 10 further comprises at least one controller 24 in communication with the molding unit 12, the furnace 16, the feeding mechanism 14, the tilt apparatus 18, and the separation unit 22. The controller 24 is arranged to control the molding unit 12, the furnace 16, the feeding mechanism 14, the tilt apparatus 18, and the separation unit 22. The system 10 further comprises a power source 26 arranged to power the molding unit 12, the furnace 16, the feeding mechanism 14, the tilt apparatus 18, the separation unit 22, and the controller 24.

Figure 6:
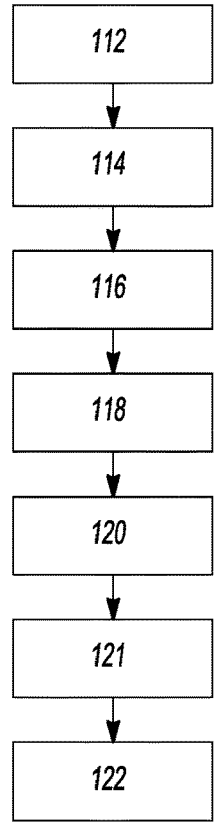
FIG. 6 is a flowchart of a method of manufacturing a cast aluminum reverse tilt-poured fuel cell cradle in accordance with one example of the present disclosure.

FIG. 6 depicts a method 110 of manufacturing a cast aluminum reverse tilt-poured fuel cell cradle having low porosity for a vehicle in accordance with one example of the present disclosure. In this example, the method 110 may be implemented by the system 10 of FIG. 1. The method 110 comprises in box 112 providing a negative cast mold 30 having cavities to form the cradle. The mold 30 comprises at least one molded cavity, preferably a plurality of molded cavities, to define the cast aluminum reverse tilt-poured fuel cell cradle. The mold 30 has a pattern with dimensions of the cast aluminum cradle. In one example, the mold 30 has patterns made with carbon steel. An assembly of cores may then be disposed within the mold 30 to further define the dimensions or structure of the pattern. It is to be understood that the mold 30 may be made by any other suitable manner without departing from the spirit or scope of the present disclosure.

As discussed above and in FIGS. 2A-4, the cradle comprises a plurality of support legs 32 interconnectedly arranged to define a framework 34 having first and second sides 36, 38 for supporting the fuel cell. As mentioned, the first side 36 is a front side and the second side 38 is a back side of the framework 34. Moreover, the back side of the framework 34 comprises a waffle structure as will be described in greater detail below. Additionally, the framework has a length greater than a width defining the longitudinal axis formed along the length thereof.

The framework 34 has horizontal and vertical casting orientations about the longitudinal axis for casting the cradle. In FIGS. 2A and 2B, the framework 34 is shown to be in the vertical casting orientation along a vertical plane. In one embodiment, the vertical plane defines a front cut half and a back drag half of the cradle. As discussed above, the framework 34 has an axis of rotation about which the framework 34 may be moved, tilted, or rotated during a method of making the cradle.

As shown in FIG. 2B, each support leg 32 has peripheral edges 40 formed thereabout. Moreover, each support leg 32 has a first outer ridge 42 and a second outer ridge 44 formed on the peripheral edges 40 relative to the vertical casting orientation on the second side 38 of the framework 34. In this aspect, each of the outer ridges extends therealong on the second side 38. Furthermore, at least one support leg 32 has one inner ridge 46 formed away from the peripheral edges 40 and extends thereacross on the second side 38.

Referring to FIG. 2B, the cradle further comprises a plurality of peripheral bosses 50 formed on the second side 38 of the framework 34 for structural attachment defining a riser contact area. Each peripheral boss 50 has a boss diameter. Moreover, each peripheral boss 50 is formed on one of the support legs 32 and in abutment with one of the first outer ridge 42 and the inner ridge 46.

Referring to FIGS. 2B-4, the cradle further comprises at least one secondary boss 70 disposed adjacent to one peripheral boss 50 on the second side 38 of the framework 34 and arranged downward therefrom relative to the vertical casting orientation. Each secondary boss 70 has the boss diameter.

As shown in FIG. 6, the method 110 further comprises in box 114 providing a feeding mechanism 14 disposed about the cast mold 30 and in fluid communication with the cavities thereof. The feeding mechanism 14 of the system 10 in FIG. 1 may be implemented in the method 110. Preferably, the feeding mechanism 14 is arranged to feed the molten metallic material in the at least one cavity of the mold 30 defining the dimensions of the cradle to be cast.

As discussed above, the feeding mechanism 14 comprises a pouring ladle (not shown), a down sprue (not shown), a filter (not shown) in fluid communication with the down sprue, and a runner in fluid communication with the down sprue and with the cast mold 30. As shown, the runner is disposed about the cast mold 30.

As discussed above and shown in FIGS. 2B and 3A-4, the runner 80 comprises a first inlet 81 and a second inlet 83 in fluid communication with the first inlet 81. The first and second inlets 81, 83 are arranged in an upward direction relative to the vertical orientation. Moreover, the runner 80 comprises first and second stoppers 85 arranged to be connectable to the first inlet 81 and the second inlet 83 to avoid backflow. As depicted in FIGS. 5A and 5B, each stopper includes a plug 88 and a pin 91 insertable through the plug 88. In this example, the pin 91 may have a gate 92 attached thereto and biasing members 94 attached to the gate 92. It is to be understood that the first and second stoppers 85 may comprise any other suitable mechanism to prevent backflow during cooling and solidification without departing from the spirit or scope of the present disclosure.

As shown in FIG. 3A, the runner 80 is formed such that the first and second inlets 81, 83 are higher in position from the cast mold relative to the horizontal casting orientation.

In this example, the runner 80 has a neck that extends upwardly to first and second inlets 81, 83 to prevent backflow of the metallic material during cooling and solidification of the metallic material.

In this example, the pouring ladle receives molten metallic material (e.g., aluminum) for pouring the molten metallic material in the down sprue having the filter to eliminate oxides from the molten metallic material. As mentioned, the down sprue is in fluid communication with the runner (here, a double runner with first and second wings) through which the molten metallic material flows from the filter.

As mentioned above and shown in FIGS. 2B-3B, the feeding mechanism 14 further comprises a plurality of ingates 82 in fluid communication with the runner and the cavities of the cast mold 30. Each ingate 82 has a first ingate side 84 connected to the runner 80 extending to a second ingate side 86 connected to the cast mold 30. As depicted in FIG. 2B, the feeding mechanism 14 further comprises a plurality of primary risers 90 connected to and in fluid communication with cavities of the cast mold 30. Each primary riser 90 is connected to one support leg 32 at one of the riser contact areas 54 on the second side, and is arranged adjacent to one peripheral boss 50. Moreover, each primary riser 90 is arranged vertically above the one peripheral boss 50 relative to the horizontal casting orientation of the framework 34. Preferably, each primary riser 90 has a height that is at least twice the boss diameter. Additionally, each primary riser 90 preferably has a width that is greater than the boss diameter.

Referring to FIG. 6, the method 110 further comprises in box 116 melting a first metallic material at a predetermined temperature to define a molten metallic material. The step of melting may be accomplished with the furnace 16 of the system 10 in FIG. 1. As such, the furnace 16 is arranged to melt a first metallic material at a predetermined temperature to define a molten metallic material. In one example, the furnace 16 may have a temperature of between 650° C. and 900° C. In one embodiment, the furnace 16 may be charged with aluminum. The furnace 16 may be an electric arc furnace, an induction furnace, or any other suitable furnace without departing from the spirit or scope of the present disclosure. Moreover, the first metallic material may comprise 7.0 weight percent (wt %) silicon (Si), 0.4 wt % magnesium (Mg), 0.14 wt % iron (Fe), and a balance of aluminum (Al).

As shown in FIG. 6, the method 110 further comprises in box 118 moving the cast mold 30 and the feeding mechanism 14 from the horizontal casting orientation to the vertical casting orientation about the longitudinal axis while feeding molten metallic material through the runner to the cavities of the cast mold 30. In one example, the tilt apparatus 18 of the system 10 in FIG. 1 is implemented to move the cast mold 30 and the feeding mechanism 14.

As discussed above, the tilt apparatus 18 is moveably connected to the cast mold 30 and the feeding mechanism 14. The tilt apparatus 18 is arranged to move the cast mold 30 and the feeding mechanism 14 from the horizontal casting orientation to the vertical casting orientation about the rotational axis while feeding molten metallic material through the runner to the cavities of the cast mold 30. The tilt apparatus 18 is arranged to move or tilt the cast mold 30 and feeding mechanism 14 at a controlled speed, e.g., 2 degrees per second.

Moreover, after feeding the molten metallic material through the runner to the cavities of the cast mold, the method 110 further comprises in box 120 reverse tilting or moving the cast mold and feeding mechanism from the vertical orientation to the horizontal orientation about the longitudinal axis. During reverse tilting, the first stopper 85 is connected to the first inlet 81 and the second stopper 85 is connected to the second inlet 83. Positioning of the risers as described above and the reverse tilt allows the molten metallic material to more uniformly solidify with less porosity in the cast.

The cast mold 30 may then be gated or sealed with chemically bonded sand. Thereafter, the molten metallic material is allowed to cool in the cast mold 30 and in the risers to a set temperature, e.g., about 450° C., in a designated cooling area (discussed below) to solidify the molten metallic material in the plurality of molded cavities of the mold 30 to form a target component having dimensions of the cradle. Preferably, the cradle is made of aluminum alloy comprising the composition discussed above.

Referring to FIG. 6, the method 110 further comprises in box 121 cooling the molten metallic material at a first solidification time in the cast mold 30 and a second solidification time in the plurality of risers to define a solidified metallic material in the risers and in the cast mold 30 having dimensions of the cast aluminum fuel cell cradle. In one example, the cooling area 20 of the system 10 in FIG. 1 is arranged to solidify the molten metallic material at a first solidification time in the cast mold 30 and a second solidification time in the plurality of risers. It is to be understood that the second solidification time is greater than the first solidification time such that shrinkage of the solidified metallic material occurs in the risers away from the cast mold 30. That is, during the solidification of the molten metallic material, shrinkage of the metallic material is compensated by allowing shrinkage to occur away from the cast mold 30 in the respective risers. Such compensation is due in part by the riser geometry.

In one example, the first metallic material of the cradle is preferably aluminum alloy, e.g., A356. Moreover, the solidified metallic material has a Young's module or modulus of elasticity (E) of about 75 GPa. Additionally, the solidified metallic material has an ultimate tensile strength (UTS) of about 310 megapascal (MPa), a yield strength (YS) greater than 250 MPa, and elongation (EL) of between 5% and 12%. Furthermore, the solidified metallic material has a porosity of less than 10%.

FIG. 6 further depicts the method 110 further comprising in box 122 separating the solidified metallic material from the negative sand cast mold 30 to define the cast aluminum tilt-poured fuel cell cradle. The step of separating may be accomplished by the separation unit 22 of the system 10 in FIG. 1. As discussed, the separation unit 22 is arranged to separate the solidified metallic material from the negative cast mold 30 to define the cast aluminum tilt-poured fuel cell cradle. In one embodiment, the separation unit 22 is arranged to shakeout or remove the mold 30 comprising the chemically bonded sand from the target component. To accomplish removal of the mold 30 from the target component, an automated unit may be used to break the mold 30 and obtain the target component therefrom. For example, a vibration unit or table may be used having a bottom catch screen for receiving mold particles from the mold. It is to be understood that breaking the mold by any other suitable manner may be used without departing from the spirit or scope of the present disclosure.

In this example, the separation unit 22 is further arranged to degate the target component after removing the mold 30 from the target component. As known in the art, degating the target component may involve removing parts of bonded sand used to fill the mold 30 during casting and gating. Moreover, the separation unit 22 is further arranged to clean the target component after degating. As discussed above, a shot blast machine may be used to apply or shoot beads (e.g. metallic beads) on surfaces of the target component. To meet alloy design expectations, the separation unit 22 may also include an inspection area wherein the target component is inspected for its mechanical dimensions, mechanical properties, chemical composition, and microstructure. In one example, a computerized system such as a coordinate measuring machine (CMM) may be used to measure mechanical dimensions of the target component, defining the cradle. Any suitable methods and apparatus may be used to evaluate dimensions, mechanical properties, chemical composition, and microstructure of the cradle without departing from the spirit or scope of the present disclosure.

It is to be understood that the term "about" used herein means up to +/−10% of the value of the parameter. For example, about 270° C. may include a range of between 243° C. and 297° C. In another example, about 40 microns may include a range of between 36 microns and 44 microns.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of manufacturing a cast aluminum reverse tilt-poured fuel cell cradle for a fuel cell, the method comprising:
    providing a cast mold having cavities to form the cradle, the cradle comprising:
        a plurality of support legs interconnectedly arranged to define a framework having first and second sides for supporting the fuel cell, the framework having a length greater than a width to define a longitudinal axis formed along the length, the framework having horizontal and vertical casting orientations about the longitudinal axis for casting the cradle, each of the plurality of support legs having peripheral edges thereabout, each of the plurality of support legs having a first outer ridge and a second outer ridge formed on the peripheral edges relative to the vertical casting orientation on the second side of the framework, each of the first and second outer ridges extending therealong on the second side, at least one of the plurality of support legs having one inner ridge formed away from the peripheral edges and extending thereacross on the second side; and
        a plurality of peripheral bosses formed on the second side of the framework for structural attachment to define a riser contact area, each peripheral boss having a boss diameter, each peripheral boss formed on one of the plurality of support legs and in abutment with one of the first outer ridge and the inner ridge;
    providing a feeding mechanism disposed about the cast mold and in fluid communication with the cavities thereof, the feeding mechanism comprising:
        a runner disposed about and in fluid communication with the cast mold;
        a plurality of ingates in fluid communication with the runner and the cavities of the cast mold, each ingate having a first side connected to the runner extending to a second side connected to the cast mold; and
        a plurality of primary risers connected to and in fluid communication with cavities of the cast mold, each primary riser being connected to one of the plurality of support legs at one of the riser contact areas on the second side and arranged adjacent to the one peripheral boss, each primary riser being arranged vertically above the one peripheral boss relative to the horizontal casting orientation of the framework;
    melting a first metallic material at a predetermined temperature to define a molten metallic material;
    moving the cast mold and the feeding mechanism from the horizontal casting orientation to the vertical casting orientation about the longitudinal axis while feeding the molten metallic material through the runner to the cavities of the cast mold;
    after feeding, moving the cast mold and the feeding mechanism from the vertical orientation to the horizontal orientation about the longitudinal axis;
    cooling the molten metallic material at a first solidification time in the cast mold and a second solidification time in the plurality of primary risers to define a solidified metallic material in the primary risers and in the cast mold having dimensions of the cast aluminum fuel cell cradle, the second solidification time being greater than the first solidification time such that shrinkage of the solidified metallic material occurs in the primary risers away from the cast mold; and separating the solidified metallic material from the cast mold to define the cast aluminum tilt-poured fuel cell cradle.

2. The method of claim 1 wherein each primary riser has a height that is at least twice the boss diameter.

3. The method of claim 1 wherein each primary riser has a width that is greater than the boss diameter.

4. The method of claim 1 wherein the cradle further comprises at least one secondary boss disposed adjacent to one peripheral boss on the second side of the framework and arranged downward therefrom relative to the vertical casting orientation, each secondary boss having the boss diameter.

5. The method of claim 1 wherein the first metallic material comprises: 7.0 weight percent (wt %) silicon (Si), 0.4 wt % magnesium (Mg), 0.14 wt % iron (Fe), and a balance of aluminum (Al).

6. The method of claim 1 wherein the runner comprises:
a first inlet and a second inlet in fluid communication with the first inlet, the first and second inlets arranged in an upward direction relative to the vertical orientation; and
a first stopper and a second stopper arranged to be connectable to the first inlet and the second inlet, respectively, to avoid backflow.

7. The method of claim 6 wherein moving the cast mold and feeding mechanism to the horizontal orientation comprises connecting the first stopper to the first inlet and connecting the second stopper to the second inlet to avoid backflow of molten metallic material.

8. The method of claim 1, further comprising providing a furnace arranged to melt the first metallic material at the predetermined temperature to define the molten metallic material.

9. The method of claim 1, further comprising providing a tilt apparatus moveably connected to the cast mold and the feeding mechanism, the tilt apparatus arranged to move the cast mold and the feeding mechanism from the horizontal casting orientation to the vertical casting orientation about the longitudinal axis while feeding the molten metallic material through the runner to the cavities of the cast mold.

10. The method of claim 9, wherein the tilt apparatus is arranged to move the cast mold and the feeding mechanism from the vertical orientation to the horizontal orientation about the longitudinal axis after feeding.

11. The method of claim 1, further comprising providing a cooling area arranged to solidify the molten metallic material at the first solidification time in the cast mold and the second solidification time in the plurality of primary risers to define a solidified metallic material in the primary risers and in the cast mold.

12. The method of claim 11, wherein the solidified metallic material has dimensions of the cast aluminum fuel cell cradle, the second solidification time being greater than the first solidification time such that shrinkage of the solidified metallic material occurs in the risers away from the cast mold.

13. The method of claim 1, further comprising providing a separation unit arranged to separate the solidified metallic material from the cast mold to define the cast aluminum tilt-poured fuel cell cradle.

14. The method of claim 1, further comprising providing a controller in communication with the feeding mechanism to control the feeding mechanism.

15. The method of claim 14, further comprising providing a power source arranged to power the controller.

16. A method of manufacturing a cast aluminum reverse tilt-poured fuel cell cradle for a fuel cell, the method comprising:
providing a cast mold having cavities to form the cradle, the cradle comprising:
a plurality of support legs interconnectedly arranged to define a framework having first and second sides for supporting the fuel cell, the framework having a length greater than a width to define a longitudinal axis formed along the length, the framework having horizontal and vertical casting orientations about the longitudinal axis for casting the cradle, each of the plurality of support legs having peripheral edges thereabout, each of the plurality of support legs having a first outer ridge and a second outer ridge formed on the peripheral edges relative to the vertical casting orientation on the second side of the framework, each of first and second the outer ridges extending therealong on the second side, at least one of the plurality of support legs having one inner ridge formed away from the peripheral edges and extending thereacross on the second side; and
a plurality of peripheral bosses formed on the second side of the framework for structural attachment to define a riser contact area, each peripheral boss having a boss diameter, each peripheral boss formed on one of the plurality of support legs and in abutment with one of the first outer ridge and the inner ridge;
providing a feeding mechanism disposed about the cast mold and in fluid communication with the cavities thereof, the feeding mechanism comprising:
a runner disposed about and in fluid communication with the cast mold;
a plurality of ingates in fluid communication with the runner and the cavities of the cast mold, each ingate having a first side connected to the runner extending to a second side connected to the cast mold; and
a plurality of primary risers connected to and in fluid communication with cavities of the cast mold, each primary riser being connected to one of the plurality of support legs at one of the riser contact areas on the second side and arranged adjacent to the one peripheral boss, each primary riser being arranged vertically above the one peripheral boss relative to the horizontal casting orientation of the framework;
providing a tilt apparatus moveably connected to the cast mold and the feeding mechanism;
melting a first metallic material at a predetermined temperature to define a molten metallic material;
moving, using the tilt apparatus, the cast mold and the feeding mechanism from the horizontal casting orientation to the vertical casting orientation about the longitudinal axis while feeding the molten metallic material through the runner to the cavities of the cast mold;
after feeding, moving, using the tilt apparatus, the cast mold and the feeding mechanism from the vertical orientation to the horizontal orientation about the longitudinal axis;
cooling the molten metallic material at a first solidification time in the cast mold and a second solidification time in the plurality of primary risers to define a solidified metallic material in the primary risers and in the cast mold having dimensions of the cast aluminum fuel cell cradle, the second solidification time being greater than the first solidification time such that shrinkage of the solidified metallic material occurs in the primary risers away from the cast mold; and separating the solidified metallic material from the cast mold to define the cast aluminum tilt-poured fuel cell cradle.

17. The method of claim 16, further comprising providing a furnace arranged to melt the first metallic material at the predetermined temperature to define the molten metallic material.

18. The method of claim 17, further comprising providing a cooling area arranged to solidify the molten metallic material at the first solidification time in the cast mold and the second solidification time in the plurality of primary risers to define a solidified metallic material in the primary risers and in the cast mold.

19. The method of claim 18, wherein the solidified metallic material has dimensions of the cast aluminum fuel cell cradle, the second solidification time being greater than the first solidification time such that shrinkage of the solidified metallic material occurs in the primary risers away from the cast mold.

20. The method of claim 19, further comprising providing a separation unit arranged to separate the solidified metallic material from the cast mold to define the cast aluminum tilt-poured fuel cell cradle.

* * * * *